UNITED STATES PATENT OFFICE.

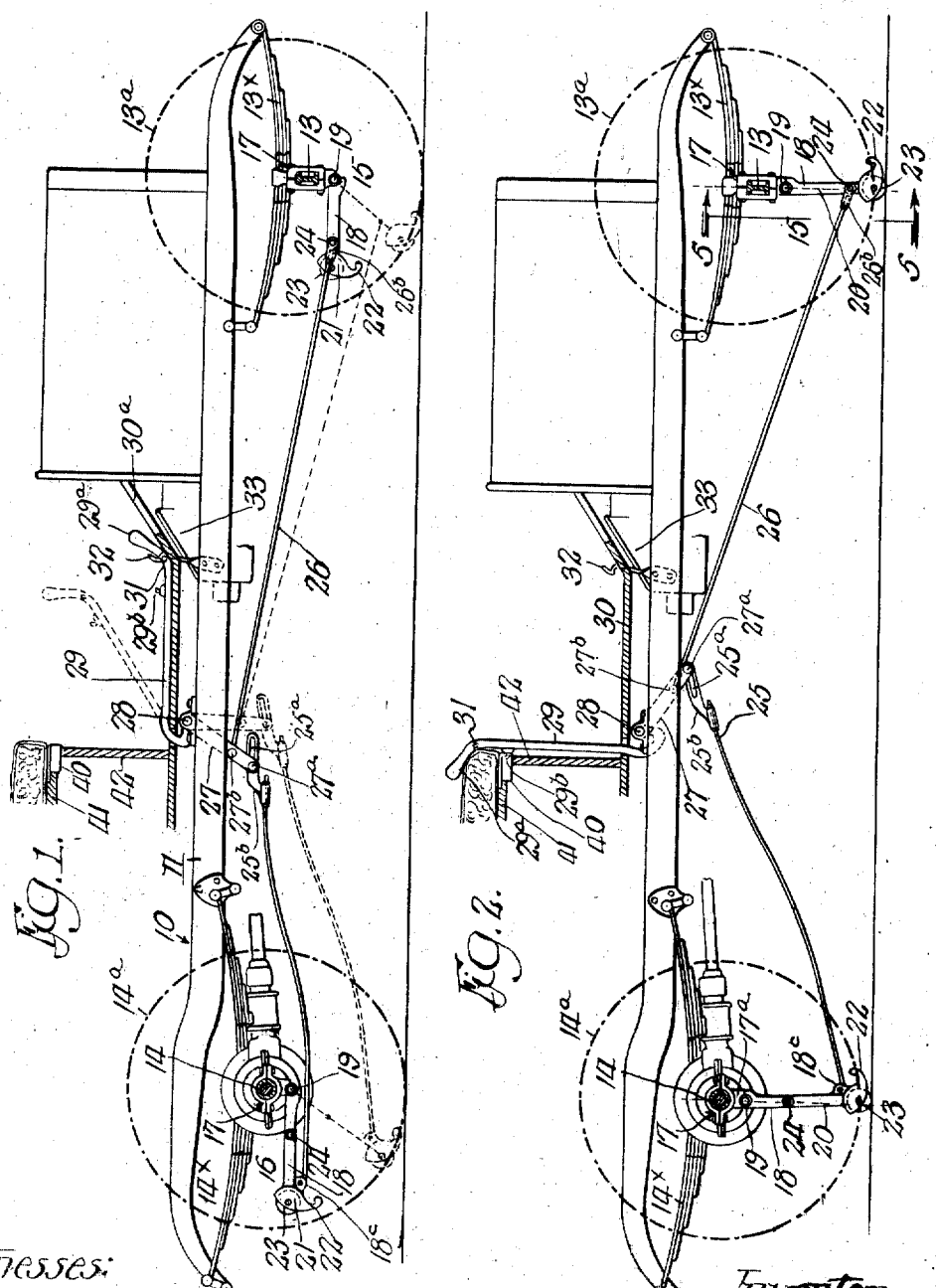

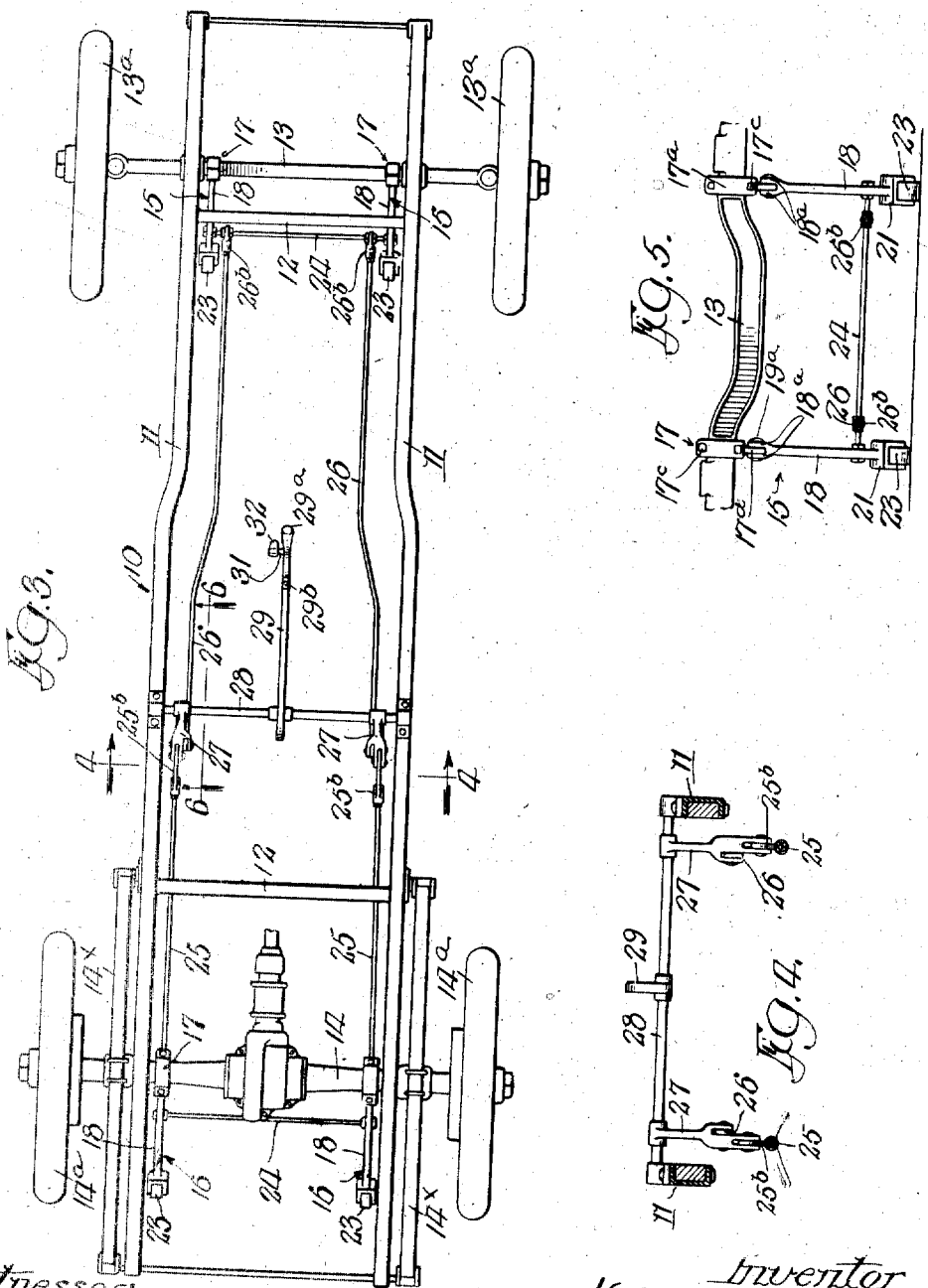

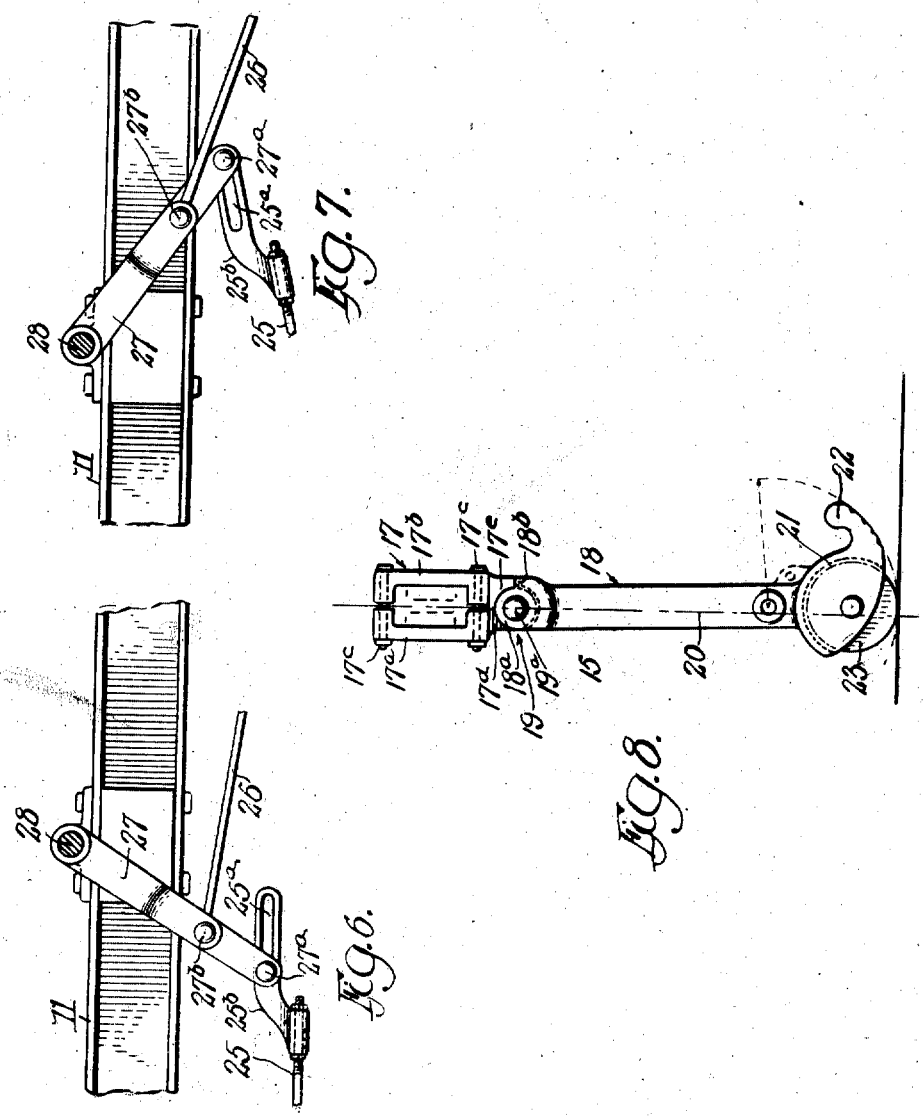

WALTER C. BELLOWS, OF CHICAGO, ILLINOIS, ASSIGNOR OF ONE-HALF TO CARRIE G. C. McKNIGHT, OF CHICAGO, ILLINOIS.

AUTOMOBILE-ELEVATING DEVICE.

1,245,310.   Specification of Letters Patent.   Patented Nov. 6, 1917.

Application filed October 18, 1915. Serial No. 56,375.

*To all whom it may concern:*

Be it known that I, WALTER C. BELLOWS, a citizen of the United States, and a resident of Chicago, in the county of Cook and State of Illinois, have invented certain new and useful Improvements in Automobile-Elevating Devices; and I do hereby declare that the following is a full, clear, and exact description thereof, reference being had to the accompanying drawings, and to the letters of reference marked thereon, which form a part of this specification.

This invention relates to an automobile elevating device and consists of the matters hereinafter described and more particularly pointed out in the appended claims.

The object of the invention is to provide a device to be attached to an automobile by means of which the automobile may be elevated a short distance and maintained in an elevated position upon a firm base, thereby relieving the tires of the weight of the machine. The device is operated by the automobile itself to elevate the automobile which may be lowered to the ground again by the exercise of but a slight effort on the part of the driver.

The device preferably includes a lock by means of which the automobile may be locked in its elevated position, thus preventing the possibility of theft of the machine. It will be apparent that when in the elevated position, repairing, pumping up or renewal of tires, washing, oiling and testing of the automobile is greatly facilitated. Other objects and advantages will appear as I proceed with my specification.

In the drawings:—

Figure 1 is a view, partly in side elevation and partly in section, of an automobile chassis to which my elevating device is attached, the parts forming said device being shown in the position they assume when the wheels of the automobile rest upon the ground.

Fig. 2 is a similar view, illustrating the parts forming my elevating device in the position they assume when the device as a whole has been operated to elevate the automobile.

Fig. 3 is a view in plan elevation of the automobile chassis provided with the improved elevating device.

Fig. 4 is a transverse sectional view on an enlarged scale through the chassis in a plane indicated by the line 4—4 of Fig. 3.

Fig. 5 is a similar view, the plane of the section being indicated by the line 5—5 of Fig. 2.

Fig. 6 is a detail sectional view to be more specifically referred to later, the plane of the section being indicated by the line 6—6 of Fig. 3.

Fig. 7 is a similar view with the parts in changed relation.

Fig. 8 is a view in side elevation on an enlarged scale of one of the pedestals forming a part of my invention.

Referring now in detail to that embodiment of my invention illustrated in the accompanying drawings:—10 indicates the frame of an automobile, which comprises the usual longitudinally extending side members 11 and transverse connecting members 12, 12. Said frame is mounted upon the front and rear axles 13 and 14 and the associated wheels $13^a$, $14^a$, through the medium of springs $13^x$, $14^x$, in a manner well known.

15, 16, indicate the pedestal members of the elevating device. Said pedestal members are made of sufficiently rigid construction to provide a stable support for the automobile when in the elevated position. As illustrated in the drawings (see Figs. 3), there is provided a pair of said pedestals for each axle, each pedestal being attached to the axle at a point near the side of the frame 10.

As the construction of each of the pedestals 15, 16, is substantially the same, a description in detail of one of said pedestals will suffice for all. Each pedestal, in the embodiment of the invention shown in the drawings, includes a clamping member 17, by means of which the main body or leg part of the pedestal is removably attached to the axle. The leg member 18 is pivotally connected to the clamping member at 19 in the manner of a knee joint (see Fig. 8). The clamping member 17 is made in two parts, $17^a$, $17^b$, which are constructed to embrace the axle and are clamped together about the axle by bolts $17^c$. Each part $17^a$ has a depending apertured ear $17^d$ and a forwardly projecting lug $17^e$, the bottom of which is located substantially in the plane of the axis of the aperture in said ear. The leg member 18 is provided at its top with laterally spaced, apertured ears of lugs $18^a$, between which the ear $17^d$ of the clamp member 17 is engaged and held by a pin or bolt $19^a$ that extends through the apertures in said ears. The ears 18ᵃ are extended forwardly to form a lug or stop 18ᵇ which abuts against and coacts with the extension 17ᶜ before referred to, so as to stop a further forward swinging movement of the lower leg part 18 when the same is in the position indicated in Fig. 8, which is just a short angular distance in front of a perpendicular line passing through the axis of the joint 19 as is indicated by the dotted line 20. The leg member 18 is provided at its bottom with a recessed foot 21, which terminates in a forwardly extending, upwardly turned toe part 22. In the recess of the foot 21 is mounted an antifriction element 23, said element and the toe part forming in effect a cam having its shortest radial length on a radial line extending through the axis pin 19ᵃ and toe 22. The leg parts 18 of each pair of pedestals are connected together by means of transversely extending rods 24. The toe parts of all the pedestals are roughened to provide friction surfaces. (See Fig. 9.)

It is apparent from the foregoing description that the leg part 18 is limited in its forward swinging movement about the axis pin 19 by the engagement of the extension lugs 17ᶜ, 18ᵇ, but may be swung rearwardly, that is to say, to the left as viewed in Fig. 8, as will presently appear.

25, 26, indicate forwardly and rearwardly extending pairs of links or rods which are operatively connected at one end to the rear and front pedestals 16 and 15 respectively. As illustrated, the links 25 are each pivotally attached at one end to ears 18ᶜ formed on the forward bottom end of the pedestals 16 adjacent the toe thereof; and each of the links 26 is operatively attached to the rod 24 by means of adjustable coupling devices, 26ᵇ, 26ᵇ, adjacent each front pedestal 15 which it connects together. The rods 25 extend toward the transverse median line of the frame 10, where they are each provided with a head piece 25ᵇ, which is capable of an endwise adjustment relative to the associated rod. Said head pieces are each connected by pins 27ᵃ, to the ends of fork arms 27 rigidly attached to a transverse rock shaft 28 near its ends. The rods 26 likewise extend toward the said arms 27 to which they are attached intermediate the ends thereof by means of pins 27ᵇ. The said rock shaft 28 is journaled in suitable bearing brackets attached to the side frame members 11. It is apparent from the foregoing description that the rods 25, 26, are adjustable in length, this construction being provided in case the front and rear axles 13 and 14 respectively of the car to which the device is attached, are not exactly parallel, owing either to accident or faulty construction. Each head piece 25ᵇ is provided at that end which is connected to the associated fork arm 27, with a slot, 25ᵃ, the purpose of which will appear later. 29 indicates an operating lever which is rigidly attached to the rock shaft 28, intermediate its ends. Said lever is so formed and is so connected through the fork arms 27 and links 25, 26, that when the legs 18 are in a horizontal position as is illustrated in Fig. 1 (as when the wheels of the automobile are resting on the ground), the lever is placed in a horizontal position and extends forwardly along the floor 30 of the automobile.

The free end of said lever is bent upwardly to provide a hand hold 29ᵃ which normally is raised above the foot board 30ᵃ. Said lever has a laterally extending pin 31, which is engaged under a foot-operated spring latch 32, projecting above the foot board 30ᵃ. This latch is supported upon any fixed part of the automobile body and as is illustrated in this instance, is attached to the crank case of the motor 33. The spring latch 32 thus maintains the pedestals in raised position.

The operation of the parts thus far described is as follows: Assuming that the automobile to which my improved elevating device is attached has been stopped in its travel, and the driver desires to elevate it. The driver (without stopping the engine, if it is running), first releases the foot latch 32 from its engagement with the pin 31 on the operating lever 29. Gravity will cause the pedestals to drop and with them the links 25, 26, and the rock arms 27, to which said links are connected. The length of the links 26 and the length of the links 25 from their pivotal connection at their rear ends with the rear pedestals 18 to the rear ends of the slots 25ᵃ at their forward ends, are so designed in proportion, that when the pedestals thus drop, the toe part 22 of the front pedestals only will strike the ground while the toe parts of the rear pedestals will be arrested shortly above the ground, as illustrated in Fig. 1. The pedestals are now in position to elevate the car. The driver now throws in the reverse gear and backs up the car. The friction of the toe parts of the cams at the bottom ends of the pedestals on the ground prevent said ends from moving as the car moves, with the result that the car body is swung about the pivotal connection of said pedestal with the axles, up on the pedestals, so as to elevate the car. As the rear pedestals do not engage the ground at the beginning of the backing up movement of the car, the rear wheels of the car are still engaged with the ground, so as to provide the necessary traction to start and impart sufficient momentum to the car to carry it up on the pedestals. Just as the pedestals are swung toward their final position as illustrated in full lines in Fig. 2, the anti-friction wheels come into contact with the ground and act to relieve the shock due to the sudden stopping of the car in elevated position, said anti-friction wheels permitting the momentum of the car to be lost in a small rearward movement on the antifriction wheels. The car is then supported on the elevating device and rests upon a firm base provided by the four pedestals.

When it is again desired to lower the car, the operator grasps the handle 29ª and swings the lever 29 forward. This has no effect on the rear pedestals in the first instance, since the pins 27ª simply slide in the slots 25ª of the links connected to said pedestals. The pedestals on the front axle 15, however, are drawn rearwardly until they pass the vertical position 20, when the weight of the car swings the front wheels to the ground. In this movement the pins 27ª first slide to the rear ends of the slots 25ª. This movement is without effect until they strike said rear ends, when the swinging movement of the front pedestals, under the falling momentum of the car, force the rear pedestals to swing from their supporting position below the axle. The parts are now approximately in the positions shown in dotted lines in Fig. 1. It is only required then to lift the pedestals to their normal position, which is easily done by swinging the lever 29 to its initial locked position.

The automobile may be locked in the elevated position shown in Fig. 2, by any suitable device, as, for example, the following. Fixed to the operating lever 29 near its handhold 29ª is a lug or detent 29ᵇ which, when the said lever is in the position shown in Fig. 2, (wherein the pedestals are in their upright position), is adapted to coact with a lock 40 fixed at the junction of the heel and seat boards 41, 42, respectively. Said lock is preferably of the "spring catch" type so that when the lever 29 is moved into the upright position as shown in said figure under the action of the elevating pedestals, the detent 29ª will enter into said lock and be held thereby until released by the operator of the automobile, by means of a key or other controlling device. This lock is protected or covered by the seat cushion 43 and in no manner is the operator inconvenienced thereby.

The locking of the lever 29 by the locking pin 40 is thus automatic for the reason that as the car is elevated upon its pedestal, the connecting links 25 and 26 will cause the arms 27 to swing about the shaft 28 as an axis, said shaft carrying with it the lever 29, (to the left as is illustrated in Fig. 6), when the detent 29ª thereon will enter the lock and be held thereby.

It is apparent that my improved elevating device possesses many advantages. Thus when a car is not in use, the tires are relieved of its weight. This is advantageous especially when tires are semi-inflated, for when carrying a dead load in this condition, the tire-fabric is weakened and the rubber will lose its resiliency. A tire so weakened is the more apt to blow out. My improved elevating device will automatically elevate and hold the automobile in the elevated position with its tires free from the ground when at a standstill as readily on a street as in a garage. It may be locked in this elevated position upon a base of stability and firmness and cannot be moved until unlocked, which prevents theft. It is easily attached to any automobile and especially is advantageous when repairing the car or for any other reason.

When an automobile to which the device is applied is in an elevated position the tires are kept free from the oil, grease and alkali generally found upon garage floors, which all act as agents of destruction for tires. Again, when inflating the tires, the operator need not pump up the entire weight of the machine as when the wheels are on the ground. It also facilitates the placing of anti-skid chains upon tires. The pedestals, when in the position indicated by dotted lines in Fig. 1, may be used as a drag brake when moving forwardly and also as a rear brake when upon dangerous inclines and hills. These and other advantages will be familiar to the users of automobiles.

In describing the form of the invention as illustrated herein, it has been stated that upon release of the main operating lever 29, the front and rear pedestals 15 and 16 would swing forwardly and downwardly with the front pedestals 15 reaching the ground in advance of the rear pedestals. By adjusting the length of the links 25 through the means hereinbefore mentioned the rear pedestals 16 may be made to reach or engage with the ground at the same time as the front pedestals do. Under such conditions, the said rear pedestals when engaged with the ground, may be used as a sprag brake and also as a means for resisting skidding of the automobile when making turns upon slippery roads or pavements.

While in describing my invention, I have referred to certain details of construction and arrangement, it is to be understood that the invention is to be in no way limited thereby except as may be pointed out in the appended claims.

I claim as my invention:—

1. An elevating device for wheeled vehicles, in combination with a frame, front and rear pedestals connected in pairs near the four corners of said frame, each pedestal being hinged to swing longitudinally of the frame from a substantially horizontal position to a substantially vertical position, means limiting the said swinging movement of said pedestals, an operating member mounted in said vehicle, means connecting each of the two pairs of pedestals with said operating member, the connecting means for one pair of pedestals including a lost motion device, whereby said pair of pedestals is made capable of limited movement independently of the other pair, and means for locking said operating member when the pedestals are in raised position.

2. An elevating device for wheeled vehicles, in combination with a frame, front and rear pedestals, connected in pairs near the four corners of said frame, each pedestal being hinged to swing longitudinally of the frame from a substantially horizontal position to a substantially vertical position, each pedestal being provided with a cam at its bottom end, which includes an anti-friction roller, means limiting the said swinging movement of said pedestals, a rock arm mounted on said frame intermediate said pairs of pedestals, links connecting each pair of pedestals with said rock arm, the link connection for the rear pair of pedestals including a lost motion device, whereby the rear pair of pedestals is made capable of limited movement independently of the front pair, a lever arm for operating said rock arm, and means for locking said lever arm with the pedestals in raised position.

3. An elevating device for wheeled vehicles, in combination with a frame, front and rear pedestals connected in pairs near the four corners of said frame, each pedestal being hinged to swing longitudinally of the frame from a substantially horizontal position to a substantially vertical position, means limiting the said swinging movement of said pedestals, a rock shaft mounted on said frame intermediate said pairs of pedestals, a rock arm on said rock shaft associated with each front and rear pedestal at one side of the frame, links connecting each pedestal with the associated rock arm, the links connecting one pair of pedestals with the rock arms including means providing lost motion between the pedestals and the rock arms, while the links connecting the other pair of pedestals with the rock arms prevent such motion, an operating lever fixed to said rock shaft, and means for locking said lever in position with the pedestals in raised position.

4. An elevating device for wheeled vehicles, in combination with a frame, front and rear pedestals connected in pairs near the four corners of said frame, each pedestal being hinged to swing longitudinally of the frame from a substantially horizontal position to a substantially vertical position, each pedestal being provided with a cam at its bottom end, which includes an anti-friction roller, means limiting the said swinging movement of said pedestals, an operating member mounted in said vehicle, means connecting each of the two pairs of pedestals with said operating member, the connecting means for one pair of pedestals including a lost motion device, while the connecting means for the other pair of pedestals prevents such motion, means for locking said operating member when the pedestals are in raised position, and a key controlled locking device for automatically locking said elevating device with the pedestals in their vertical position.

5. An elevating device for wheeled vehicles, in combination with a frame, front and rear pedestals connected in pairs near the four corners of said frame, each pedestal being hinged to swing longitudinally of the frame from a substantially horizontal position to a substantially vertical position, means limiting the said swinging movement of said pedestals, a rock arm mounted on said frame intermediate said pairs of pedestals, links connecting each pair of pedestals with said rock arm, the link connection for one pair of pedestals including a lost motion device, while the link connection for the other pair of pedestals prevents lost motion, a lever arm for operating said rock arm, means for locking said lever arm with the pedestals in raised position, and a key controlled locking device for automatically locking said elevating device with the pedestals in their vertical position.

6. An elevating device for wheeled vehicles, in combination with a frame, front and rear pedestals connected in pairs near the four corners of said frame, each pedestal being hinged to swing longitudinally of the frame from a substantially horizonal position to a substantially vertical position, means limiting the said swinging movement of said pedestals, a rock shaft mounted on said frame intermediate said pairs of pedestals, a rock arm on said rock shaft associated with each front and rear pedestal at one side of the frame, links connecting each pedestal with the associated rock arm, the links connecting one pair of pedestals with the rock arms including means providing lost motion between the pedestals and the rock arms, while the links connecting the other pair of pedestals with the rock arms prevent lost motion between the pedestals and the rock arms, an operating lever fixed to said rock shaft, means for locking said lever in position with the pedestals in raised position, and a key controlled locking device associated with said operating lever for automatically locking said frame in the position which it assumes when the pedestals are in vertical position.

7. An elevating device for wheeled vehicles, in combination with a frame, front and rear pedestals connected in pairs near the four corners of said frame, each pedestal being hinged to swing longitudinally of the frame from a substantially horizontal position to a substantially vertical position, each pedestal being provided with a cam at its bottom end, which includes an anti-friction roller, means limiting the said swinging movement of said pedestals, a rock shaft mounted on said frame intermediate said pairs of pedestals, a rock arm on said rock shaft associated with each front and rear pedestal at one side of the frame, links connecting each pedestal with the associated rock arm, the links connecting each of one pair of pedestals with the rock arms including means providing lost motion between the pedestals and the rock arms, while the links connecting each of the other pair of pedestals with the rock arms prevent such lost motion, an operating lever fixed to said rock shaft, means for locking said lever in position with the pedestals in raised position, and a key controlled locking device associated with said operating lever for automatically locking said frame in the position which it assumes when the pedestals are in vertical position.

8. An elevating device for wheeled vehicles, in combination with a frame, front and rear pedestals connected in pairs near the four corners of said frame, each pedestal being hinged to swing longitudinally of the frame from a substantially horizontal position to a substantially vertical position, means limiting the said swinging movement of said pedestals, an operating member mounted in said vehicle, means connecting each of the two pairs of pedestals with said operating member, the connecting means for the rear pair of pedestals including a lost motion device, while the connecting means for the forward pair of pedestals prevent lost motion, and means for locking said operating member when the pedestals are in raised position.

9. An elevating device for wheeled vehicles, in combination with a frame, front and rear pedestals connected in pairs near the four corners of said frame, each pedestal being hinged to swing longitudinally of the frame from a substantially horizontal position to a substantially vertical position, means limiting the said swinging movement of said pedestals, an operating member mounted in said vehicle, means connecting each of the two pairs of pedestals with said operating member, a latch device securing said operating lever in a position maintaining said pedestals in their substantially horizontal position, said pedestals swinging downwardly upon release of said latch device until several of said pedestals engage the ground, and assume an inclined position and means operatively connecting all of said pedestals together in a manner permitting said pedestals to assume a substantially upright position upon a rearward movement of the vehicle.

10. An elevating device for wheeled vehicles, in combination with a frame, front and rear pedestals connected in pairs near the four corners of said frame, each pedestal being hinged to swing longitudinally of the frame from a substantially horizontal position to a substantially vertical position, means limiting the said swinging movement of said pedestals, a rock arm mounted on said frame intermediate said pairs of pedestals, links connecting each pair of pedestals with said rock arm, means providing a lengthwise adjustability of said links, the link connection for one pair of pedestals including a lost motion device, while the link connection for the other pair of pedestals prevents lost motion, a lever arm for operating said rock arm, and means for locking said lever arm with the pedestals in raised position.

In testimony, that I claim the foregoing as my invention affix my signature in the presence of two witnesses, this 14th day of October, A. D. 1915.

WALTER C. BELLOWS.

Witnesses:
T. H. ALFREDS,
SANFORD C. MCKNIGHT.